United States Patent
Valiani

(10) Patent No.: US 8,403,340 B2
(45) Date of Patent: Mar. 26, 2013

(54) SYSTEM FOR THE RAPID CHANGE OF HEAD ON OPERATING MACHINES

(75) Inventor: Franco Valiani, Certaldo (IT)

(73) Assignee: Valiani Srl, Certaldo (IT)

( * ) Notice: Subject to any disclaimer, the term of this patent is extended or adjusted under 35 U.S.C. 154(b) by 1087 days.

(21) Appl. No.: 12/306,693

(22) PCT Filed: Jul. 3, 2006

(86) PCT No.: PCT/IT2006/000508
§ 371 (c)(1),
(2), (4) Date: Dec. 25, 2008

(87) PCT Pub. No.: WO2008/004253
PCT Pub. Date: Jan. 10, 2008

(65) Prior Publication Data
US 2009/0258769 A1   Oct. 15, 2009

(51) Int. Cl.
*B23B 31/28* (2006.01)
(52) U.S. Cl. .......................... 279/128; 279/156
(58) Field of Classification Search .......... 279/128, 279/156; 248/206.5, 309.1; 403/DIG. 1; 269/8; *B23B 31/28*
See application file for complete search history.

(56) References Cited

U.S. PATENT DOCUMENTS

| | | | |
|---|---|---|---|
| 2,893,551 A * | 7/1959 | Pirwitz | 269/8 |
| 3,779,063 A * | 12/1973 | Gannon | 72/253.1 |
| 4,637,119 A * | 1/1987 | Schneider et al. | 483/69 |
| 4,941,245 A * | 7/1990 | Yamashita et al. | 407/29.13 |
| 5,123,790 A * | 6/1992 | King | 409/132 |
| 5,782,445 A | 7/1998 | Cleek | |
| 5,791,364 A * | 8/1998 | Petrone | 137/15.15 |
| 6,096,231 A * | 8/2000 | Schertler | 216/41 |
| 6,217,656 B1 * | 4/2001 | Spiering et al. | 118/500 |
| 7,296,955 B2 * | 11/2007 | Dreier | 409/218 |
| 7,992,851 B2 * | 8/2011 | Vieira et al. | 269/8 |

FOREIGN PATENT DOCUMENTS

| | | | |
|---|---|---|---|
| DE | 19842442 | | 3/2000 |
| DE | 19938114 | | 2/2001 |
| JP | 60172432 A | * | 9/1985 |
| JP | 60207737 A | * | 10/1985 |

* cited by examiner

*Primary Examiner* — Eric A Gates
(74) *Attorney, Agent, or Firm* — Themis Law

(57) ABSTRACT

A system is disclosed for the rapid change of heads in operating machines, such as equipment for the cut and/or decoration of passe-partout, or of items made of cardboard, glass, ceramic or the like. A system according to the present invention couples the head of the machine with a machine arm through a connecting element that contains one or more magnets. Said magnets retain the head connected to the connecting device by attraction, but also allow the head to be easily removed with just one hand.

8 Claims, 3 Drawing Sheets

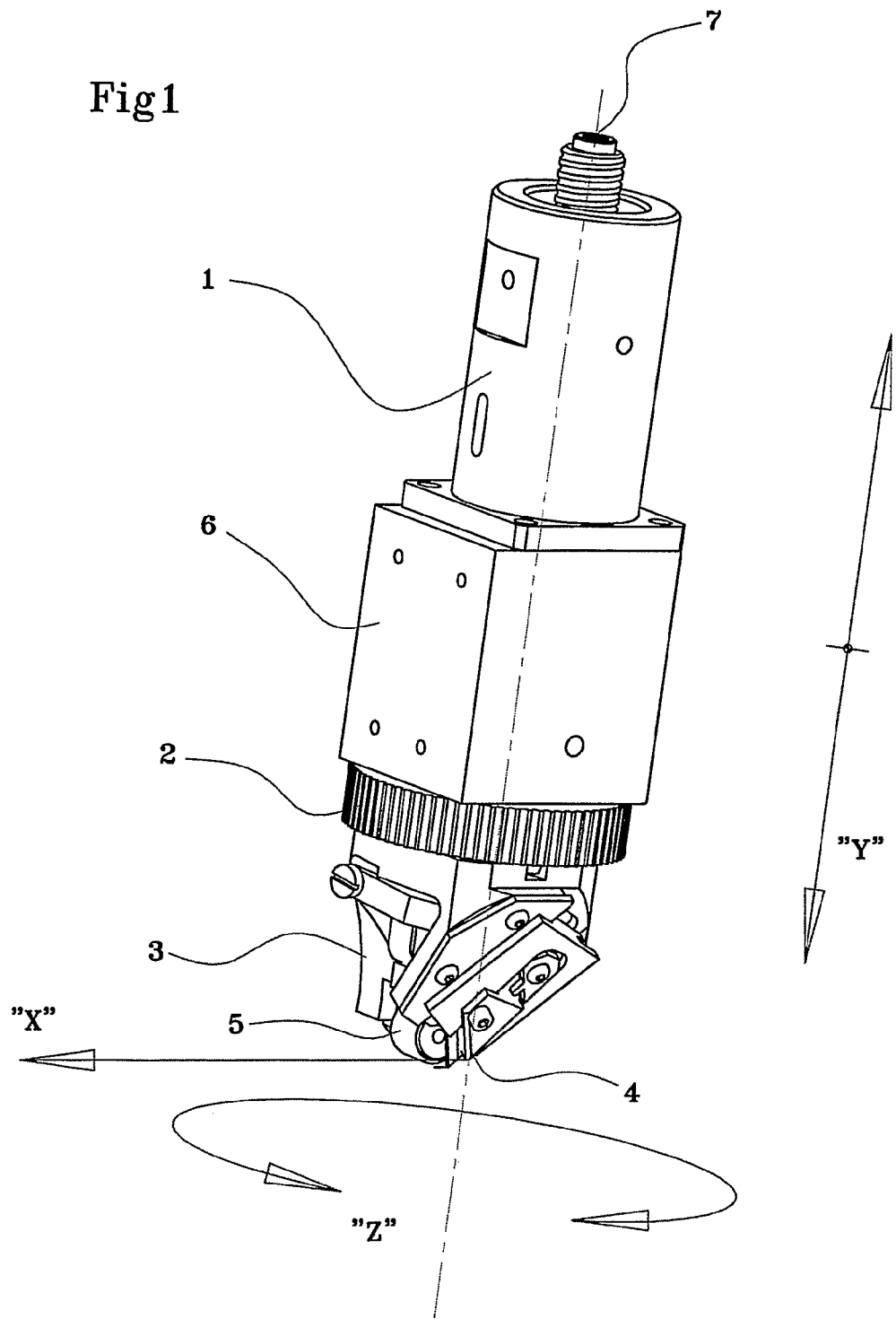

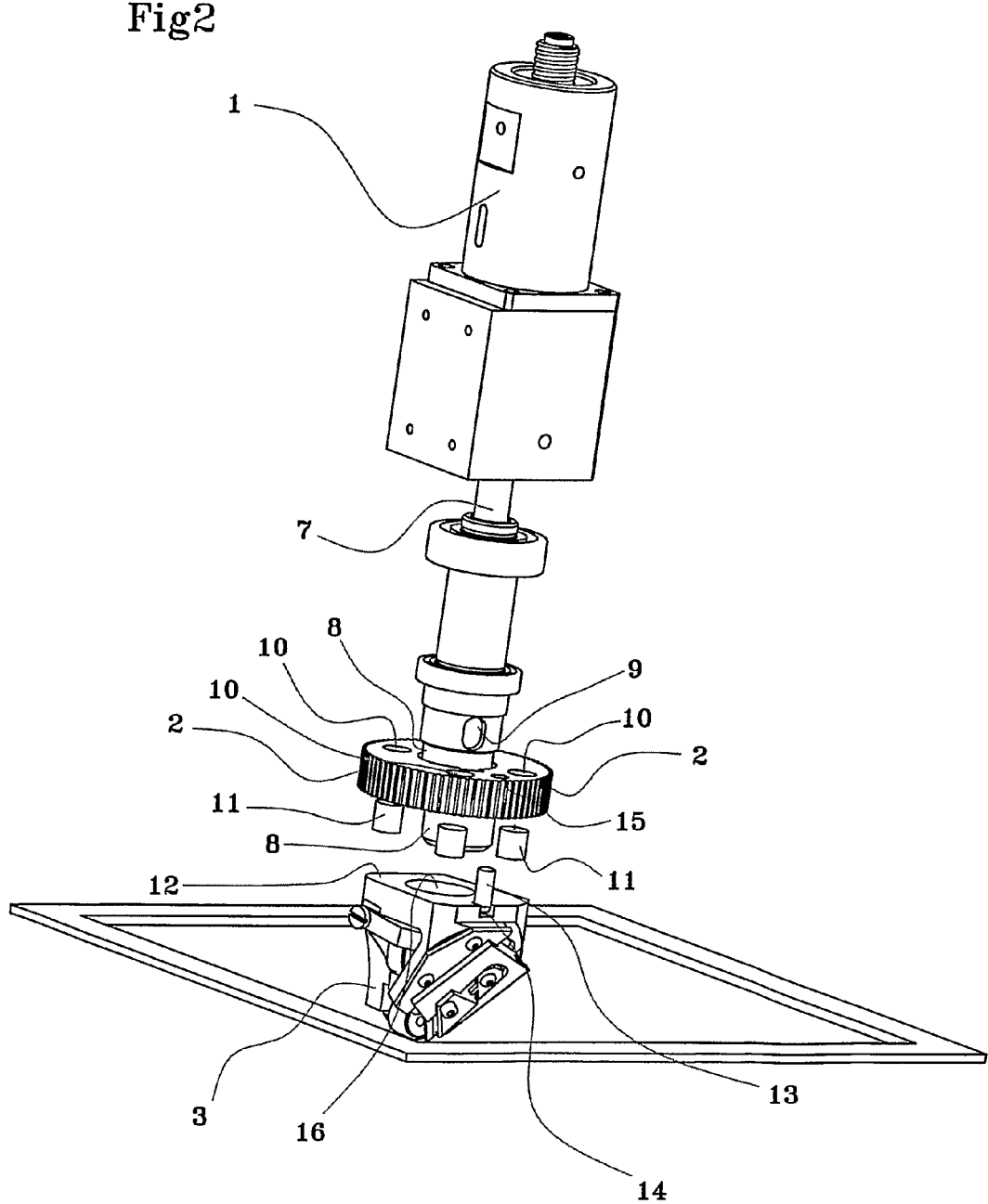

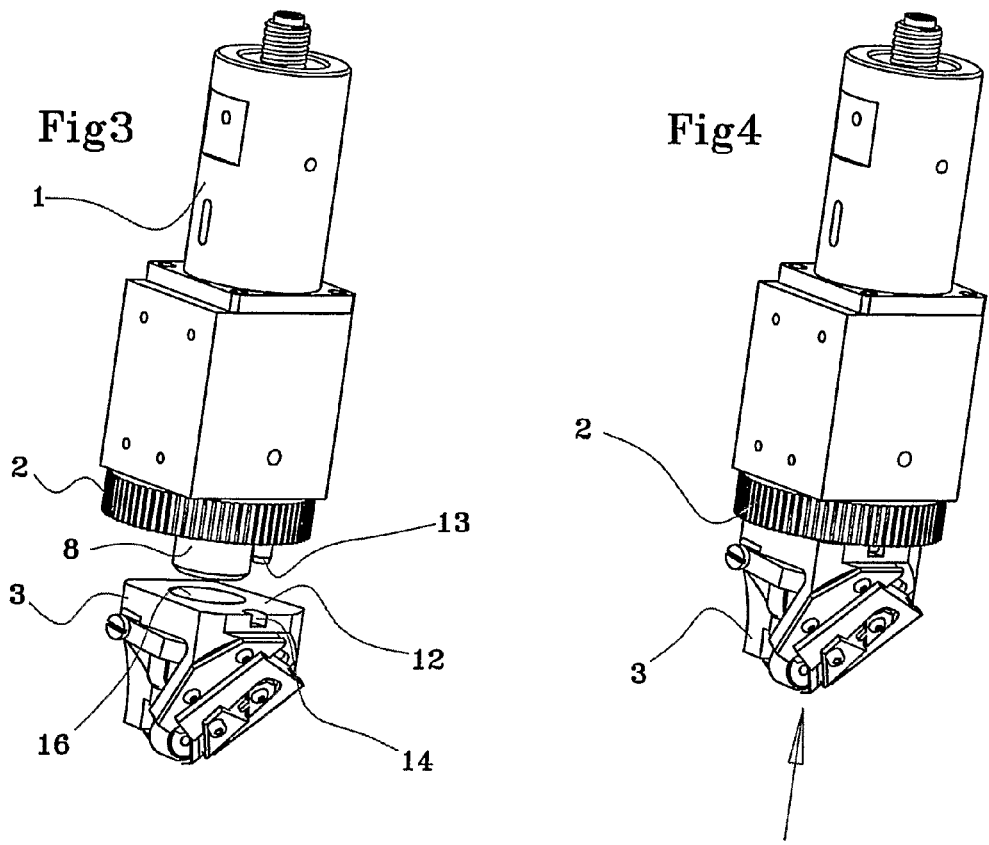
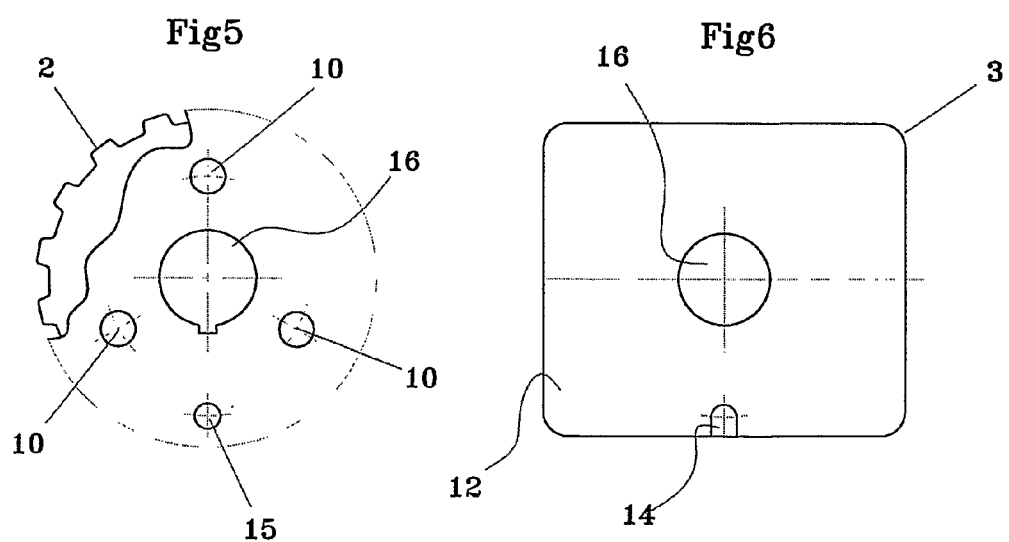

SYSTEM FOR THE RAPID CHANGE OF HEAD ON OPERATING MACHINES

TECHNICAL FIELD

The present invention concerns the technical sector relative to large and small-production machines in the field of industrial automation.

The present invention can be applied to machines having a head that must be interchanged. In particular, the present invention is herein described with reference to machines that produce a cut and/or decoration of "passe-partout" or other elements made of cardboard or corrugated cardboard, glass or ceramic, including existing machines. The head of the machine may include a "pen", or other similar element, instead of a blade.

BACKGROUND ART

Different types of machines include a moving mechanism and a main part called "head" that fulfils the desired work. The head can be used for cutting, engraving, drawing or for performing any other operation on a piece that must be worked on. In all these types of machines, it is often necessary to replace the head with a different head for performing a different type of work. It is therefore important to perform head replacement rapidly and safely.

In particular, in the paper sector, there are machines that make the cut or the decoration of cardboard, either smooth or corrugated. Similar machines are also used in the sector of decoration of items made of glass, ceramic, plastic or other material.

The present description will focus on machines used for the cut of passe-partout, in order to highlight a technical sector where the present invention can be appropriately used. The "passe-partout" is the an internal frame inserted behind the glass of pictures, with the purpose of creating a stand-out, generally of constant width between the external frame and the subject of the picture, which may be a print, painting, or other.

Shapes and dimensions of the passe-partout can vary, but the most common ones are rectangular.

The material of the passe-partouts is generally white or colored paper, thin enough to be inserted between picture and glass, which must be cut with a limited mechanical force. Nevertheless, in order to produce this cut, a suitably directed and sharp blade is required, as well as a precise speed and approaching direction.

Nowadays, different types of machines exist for this purpose, which can be briefly described as follows.

Such machines include a main group supporting the cutting head vertically, so that it can vertically moving up and down the item to be worked, including sudden directional changes of the cut. The axial movement can be either pneumatic, hydraulic or electromechanical, according to the design of the machine. These machines include an engine that allows the head to rotate, typically an electric engine, which is easier to be control electronically, and a connecting device fitted on the output shaft of the engine, so that the engine, through a timing belt, can transmit the rotation to the head holding the cutting tool.

The head, axially connected to the main group, has a vertical movement with a shaft along an axis where the connecting device is fitted.

The head of the machine can be mechanically manufactured by means of several known systems and includes a blade for cutting the paper. This blade rotates thanks to the connecting device that is axially fitted providing the blade with the desired changes of direction, without further raising the head block in case of continuous or radial geometrical shapes (such as circles, ellipses, etc.), or a linear approaching stop whenever angles must be formed, forming instead the angle after raising the head.

The transversal motion of the head block can be provided by known automatic machines.

The above-described production method offers excellent results both from a qualitative and productive point of view. Obviously, the speed of production depends on many factors.

A problem with prior art systems is the need to replacing the cutting tool manually, which obviously has different characteristics according to the different materials to be cut, the different types of cut or the different types of operations to fulfill.

Using a head as described above, it is also possible to cut packing boxes and with another head it is possible to engrave cardboard in order to create some grooves that facilitate the closing of the boxes. In this specific field, this operation is very difficult and laborious, except for some machines that have two heads (one for a 45° cut, and one for 90° cut). Nonetheless, these machines have a high cost because they an additional axis is required, beyond the standard three axes, for the additional head.

Sometimes, it is necessary to perform cuts with different slopes, 90° or 45° or other degrees. In this case, it is important to replace the head rapidly than with a traditional one-head machine and reduce costs, still providing the same technical result as with a machine equipped with more heads.

In addition, the head can be changed to substitute the blade with pens or other accessories that decorate an item instead of cutting. Yet, the final accessory holding the blade, the pen or similar, is changes on machines known in the art, but this is a slow operation.

Despite the design variations of each machine manufacturer, in order to change the head it is necessary to have a tool, such as a plug, which acts on a joint, either a threaded joint, or (conical) friction joint, or having other designs known in the art to date.

Because the head must be carried out frequently, the effectiveness of the machine is considerably reduced by these necessary interruptions. Moreover, these substitutions considerably slow down the production rates, affecting the manufacturing process.

German Patent DE 199 3 8 114 to Dürr Systems GmbH discloses a machine comprising a fixing element 1 for supporting a support element 3 for a tool 2. This machine is particularly used in car factories for performing operations like the painting or lifting of chassis. According to the solution proposed in this patent, the support tool 3 is connected to the fixing element 1 by magnetic connection 5, and is adapted to avoid the breakage of the tool 2 in case of accidental hitting against parts processed by the machine. The structure disclosed is in this patent is very complex and is not adapted to support a rotating tool and for a rapid change of the tool itself.

SUMMARY OF THE INVENTION

The present invention avoids the above-mentioned and other drawbacks by providing a system for replacing simply and rapidly, without the need of additional tools such as keys, levers or other, the head of an operating machine, in particular of cutting or decorating machines, in order to change the ancillary equipment connected to the head, like blades or pens, which can be installed from time to time on the rotating head of said machines.

This system can be used on several types of equipment with reaction forces similar to the above described machines, thus, not restricting this invention only to the specific sector of paper cutting.

By the term "head" we mean the end portion of the operating arm of a machine, equipped with tools, either for cutting, decorating or other, which act on a predetermined item. By replacing the head, the accessories applied or integrated to it are replaced as well.

The advantages resulting from the present invention essentially consist in: a faster production rate, regardless of the type of work to be done, for example cuts with different slopes and/or more or less ornate decorations; a force necessary for removing the head that is very low, therefore the head can be easily removed by any worker just with one hand; providing a component that, after assembly, does not reduce at all the effectiveness of the device, both in non-operational movements of angular approach and, above all, in the during normal operation; increasing effectiveness of a component according to the invention by pressure exerted on the tool by axial motion and kept constant by electrovalves controlled by sensors applied over a supporting wheel; a rapid change of tool; perfectly fitting existing machines; applicability to machines in different manufacturing sectors; producing any type of passe-partout of various shapes (rectangular, circular, elliptical, etc.), possibly after raising and new angular direction of the blade in case of angles.

Reduced to its essential structure and with reference to the figures of the enclosed drawings, a system for the rapid change of head in an operating machine, according to the present invention, includes a device providing a stable attraction between the head (3) and any element over it, like connecting device (2), with said element including at least one, preferably more than one, magnet or the like having enough force to keep the head bound even without mechanical block elements.

This system comprises balance elements between said element, like a connecting device, and said head.

In order to achieve an effective coupling, the head (3), equipped with a cutting blade (4) and/or a pen, the element over the head, such as a connecting device (2), includes at least one, preferably more than one, hole (10) of suitable diameter and thickness proportional to the one of said element, which receives at least one connected magnet (11), of same diameter but slightly shorter, such to avoid any projection on the outer surface.

In on embodiment, the holes (10) and the related magnets (11) are preferably three.

The magnets can be replaced with other elements capable of forming a magnetic field, such as a solenoid or other similar device. A solenoid, when energized, generates a magnetic field that can also be annulled stopping the passage of electricity. In this embodiment, it is possible to create even an intense magnetic field that causes no problems to the successive removal of the head, because it can be easily annulled in order to avoid any obstacle to said operation.

This system is also configured to couple and axially center the head (3), which is equipped with cutting blade (4) or pen or other tool, by providing a calibrated hole (16), realized on the same head, which fits during assembly on the extension of the shaft (8) of the element, such as a connecting device (2), fitted on said shaft, so obtaining a perfect longitudinal alignment.

This system also may include, between the two components (2) and (3) to be assembled, an angular radial balance, constituted by a calibrated steel plug (13) inserted into a suitable hole (15) positioned on the connecting device (2), from which it extends for a certain length.

Conveniently, in order to couple the head (3) in radial direction to said extending plug (13), this system comprises a milling (14) on the upper surface (12) of the head (3), with the same diameter and of a thickness corresponding to the above cited extension.

The head, either equipped with cutting or decorating accessories or other, realized according to the present invention, is made so that it can be simply removed with just one hand in few seconds, without any need of specific tools, and replaced with a second head equipped with a different blade and/or pen necessary for the next operation, which may be either a decoration or a different cut or working on another material.

The main feature of this invention is the extreme manufacturing simplicity of the device, facilitated by the absence, during work, of an axial removing component. Accordingly, it can conveniently develop to meet mechanical requirements in all other directions.

Therefore, this system maintains basic operation of present machines unchanged and can be easily applied to all existing machines in the paper sector and, with appropriate adjustments, to all the other machines with similar mechanical requirements.

In practice, it is sufficient to make adjustments on the apparatus holding the new accessory coupled to a blade or pen, for example, on the connecting device or other device controlled by the timing belt and the rotating engine group. Rotational motion of the head is controlled electronically on a constant basis, thus obtaining any shape—linear or curved, circular, elliptical—and providing complete versatility of with all the types of existing machines.

The connecting device, fitted on a rotating vertical shaft, free from the coaxial raising system, remains bound axially, providing for complete interchangeability.

In one embodiment, perpendicularly to the thickness of the connecting device, there are three passing holes, spaced at the same distance, with a diameter suitable to fit three magnets having cylindrical shape with the same diameter as the holes and a length not exceeding the depth of the connecting device.

Of the same diameter, or of a conveniently prefixed diameter, there is an additional passing hole, calibrated for receiving the plug of radial interference, which will be hereafter described.

The end support, holding a cutting blade or a pen and a supporting wheel, as well as the various devices indicating position, is mechanically structured to have a central calibrated hole, for balancing the shaft of the connecting device, and an upper surface shaped as a metal plane with surfaces large enough to comprise the area filled by the magnets. The same upper supporting surface has an opening, with a calibrated diameter, such that the above-mentioned plug disposes angularly the cutting element and, simultaneously, provides for a coupling of the connecting device with the upper surface.

Therefore, it will be sufficient to insert vertically and axially the device holding the blade or pen, led by the same shaft as the upper connecting device and angularly balanced thanks to an angular interference plug. The assembly is provided by the action of the three magnets on the upper metal surface of the final support and, accordingly, on the surface of the connecting device, causing a perfect contact between connecting device and blade support. The plug inside the calibrated cavity of the support a provides resistance to the applied couple, which is very limited due to the specific kind of work.

The extreme facility and rapidity for changing tools will be explained in greater detail hereafter.

The above described assembly facilitates tool removal, because the magnets have a limited force necessary for the disconnection (which means in the vertical direction towards the working plane), and does not involve any risk of disconnection during operation and/or approach of the tool, since this external force, acting perpendicularly to the direction of removal, is actually absent during working and approaching. On the contrary, during cutting, the force axially exerted and transmitted by the supporting wheel may increase the assembly action exerted by the magnets.

The invention provides a simple, practical system that can be integrated into the current machines, maintaining their advantageous features.

Therefore, one embodiment of the invention relates to a system for the rapid change of the head in an operating machine, such as equipment for the cut and/or decoration of passe-partout, or of items made of cardboard, glass, ceramic or similar, and includes at least one, preferably more than one, magnet or other device generating a magnetic field, capable of exerting an attracting force between at least one head (3) of said machine and at least one device of said machine, where the head is or can be connected, making this connection stable.

One embodiment of the invention relates to a system wherein at least one magnet—which means either a ferromagnetic body or an electric machine generating magnetic field—is placed between at least one head (3) and at least one connecting device, like a toothed wheel.

One embodiment of the invention relates to a system wherein at least one magnet—which means either a ferromagnetic body or an electric machine generating magnetic field—is comprised on at least one connecting device, for example, shaped like a toothed wheel, where at least one head (3) is connected.

One embodiment of the invention relates to a system wherein at least one, preferably more than one, magnet or similar connects, thanks to its magnetic attraction, at least one head (3) with at least one connecting device (2), connected in turn to the movable arm of the operating machine.

One embodiment of the invention relates to a system comprising a connecting device, like a toothed wheel (2), between operating machine and at least one head (3) of the same machine, which comprises in its turn at least one, preferably more than one, magnet or similar, having enough force to keep the head bound even without mechanical block elements.

One embodiment of the invention relates to a system wherein the connecting device, like a toothed wheel, is located over the head (3) where it is connected.

One embodiment of the invention relates to a system wherein, in the cutting phase, the axially exerted force increases the force exerted by the magnet(s), so reducing the risk of a possible separation of the head from the connecting device.

One embodiment of the invention relates to a system wherein the force exerted by the magnet(s) is sufficient to keep the head bound to the connecting device, but also to be overcome by an opposite force exerted on it even by one hand in an opposite direction to the force exerted by the magnet(s).

One embodiment of the invention relates to a system wherein said magnet(s) is constituted by an electric machine generating a magnetic field that is deactivated in order to remove the head (3). Thus, when said magnetic field is annulled, the attraction will cease and the head can be separated by the connecting device without any need of particular force.

One embodiment of the invention relates to a system comprising balance elements between said connecting device, like a toothed wheel, and said at least one head.

One embodiment of the invention relates to a connecting device, which may be shaped like a toothed wheel (2), between operating machine and at least one head (3) of the operating machine, and which comprises at least one, preferably more than one, magnet or similar, having enough force to keep the head bound even without mechanical block elements.

One embodiment of the invention relates to a connecting device comprising at least one, preferably more than one, holes (10) where the magnets (11) are fitted.

Said magnets may be fixed by bonding, fitting, forced assembly or any other system, which causes their position to be stable.

The shape of the hole (10) is not important, and can be circular or of any other shape.

In one embodiment, the magnets are comprised inside the thickness of the connecting device, which may be shaped like a toothed wheel, in order to avoid any obstacle to the coupling of the two contact surfaces, one of the connecting device and one of the head (3).

The holes (10) and the related magnets (11) may be more than one, preferably three.

One embodiment of the invention relates to a connecting device, which may be shaped like a toothed wheel (2) comprising a hole (15), suitably directed and calibrated, containing a plug for the angular balance (13), which extends into a groove (14) defined on the surface of the head (3).

One embodiment of the invention relates to a machine head, equipped with a cutting blade (4) and/or pen and/or other accessory necessary for the work performed by the operating machine, which comprises a calibrated hole (16) mated during assembly with the extension of the shaft (8) of the connecting device, shaped like a toothed wheel (2) and fitted on said shaft, so obtaining a perfect longitudinal alignment.

One embodiment of the invention relates to a machine head comprising a milling (14) made on the upper surface (12) of the head (3), having the same shape and thickness as the plug (13) of the device (2), so that said plug can enter into it, realizing an angular balance.

The replacement of the head through the above described system can be fulfilled either manually or automatically by means of specific machines. In practice, the manufacturing details may however vary as regards shape, size, position of elements and type of materials used, but still remain within the range of the present invention.

BRIEF DESCRIPTION OF THE DRAWINGS

The advantages of the present invention will be better understood by every expert in this field by referring to the enclosed drawings, given as practical examples of the invention but not to be considered restrictive.

FIG. 1 is a perspective view of an embodiment of the invention.

FIG. 2 is an exploded view of the embodiment of FIG. 1.

FIG. 3 is an exploded view of a detail of the embodiment of FIG. 1.

FIG. 4 is an assembled view of the detail of FIG. 3.

FIG. 5 is a top view of the connecting device in the embodiment of FIG. 1.

FIG. 6 is a top view of the surface of the head facing the connecting device in the embodiment of FIG. 1.

DETAILED DESCRIPTION OF THE INVENTION

FIG. 1 shows a perspective assembled view of the operating arm of the machine (1) with vertical movement, approximately perpendicular to the working plane, with a support (6)

of the same arm disposed along direction "Y". The vertical shafts are positioned and supported by radial and axial bearings, as known in the art, and the upper shaft (7) is coupled to a linear actuator to provide movement along the (Y) axis, while the lower shaft, although connected to upper shaft (7), is free to rotate. Connecting device (2) is coupled to the lower shaft by means of a plug (9) or other mechanical system, providing for a vertical movement of the entire system (1) and a free radial movement of the connecting wheel (2), together with the lower head (3) holding the cutting blade (4) and/or the pen as well as the wheel (5).

The rotation around the "Z" axis directs the blade (4) or the pen regardless of the relative rigidity of the arm (1). The approaching movement before a cut or the development of a decoration is a flat horizontal "X" motion, given to the arm by the machine.

FIG. 2 shows the distinctive components of an embodiment of the present invention, which allow a simple and fast installation of the head (3), equipped with cutting blade (4). This figure shows an exploded view of the internal system (7), provided with relative balances, bearings, and other necessary implements, having in the final rotating portion (8) of the shaft a place for plug (9), so as to radially couple the connecting device (2).

The two circular shaped flat surface of the connecting device (upper and lower surface of the connecting device) include some passing holes (10) that receive cylindrical magnets (11) with the same diameter and a height not exceeding the thickness of the connecting device (2).

In order to get a precise angular signal, necessary for the zero setting of the machine regardless of the replacement of the head (3), and a sufficient opposition contrasting its rotation, a plug (13) is provided having the double function of balance and torque transmission. Axial balance is guaranteed by the hole (16) on the final support, which receives the extending end of the shaft (8), whereas radial position is obtained by mating a related calibrated hole (15) made with suitable diameter, and perpendicularly to the surface of the connecting device (2). Angular stability, even if calibrated magnet (11) were to be somewhat loose, is however ensured by a fitting groove (14), generated by a milling of calibrated diameter, made on the external side and for necessary depth, in perpendicular direction, on the upper surface of the head (3).

The contact surfaces, upper surface of support (12) and lower surface of connecting device (2), are flat for maintaining a correct mechanical alignment of the system.

FIGS. 3 and 4 respectively show the simple linear movement necessary for an operator to couple the head (3). More particularly, FIG. 3 shows the head (3) removed from the block (1). The head, equipped with central calibrated hole (16) provided on the upper surface (12), is inserted by means of a simple vertical push, obviously with proper axial balance, which is ensured by the hole (16) on the calibrated extension of the axis (8), and of the angular balance, by the insertion of the extending plug (13) in the related place (14).

Therefore, the action of the magnets fitted into the connecting device (2) allows, with extreme simplicity, the assembly of the final cutting blade or pen, centered on the zero of the machine and suitable directed (FIG. 4).

For a more detailed illustration of this device, FIGS. 5 and 6 respectively show the top view of the connecting device (2) and of the upper contact surface of the head (3).

As above described, the connecting (2) comprises three passing holes (10) of suitable diameter, where the magnets fit by known systems (fitting, forced assembly with interference, etc.) while ensuring that the magnets are completely encompassed inside the thickness of the connecting device (2), in order to avoid any obstacle to the coupling of the two contact surfaces.

The connecting device (2) also defines another hole (15), suitably directed and calibrated, containing, with similar stable assembly, the plug for the angular balance (13), which extends so as to find place in a groove (14) provided on the surface of the head (3), as depicted in the FIG. 4, which shows a top view of contact surface (12). In the present embodiment, contact surface 12 has an essentially rectangular shape and includes a central calibrated hole (16), necessary for the axial balance of the components, and opening (14), of suitable dimensions, for the angular balance.

What is claimed is:

1. A system for rapidly changing a head of an operating machine comprising:
    a connecting device fitted on a final portion of a rotating longitudinal shaft of the operating machine, the connecting device having a substantially planar upper surface facing a substantially planar surface of the operating machine and a substantially planar lower surface facing a substantially planar surface of the head, a first plug radially locking the connecting device to the shaft;
    one or more devices generating a magnetic field, the magnetic field operatively and removably coupling the head to the operating machine, the one or more devices being disposed within one or more mating longitudinal first openings extending from the upper surface to the lower surface of the connecting device, the one or more devices not extending beyond the upper and lower surfaces;
    the rotating longitudinal shaft having an extended portion, the head having a centrally disposed opening shaped to mate with the extended portion of the shaft; and
    the connecting device having a second opening configured for receiving a second plug dimensioned to extend into an outwardly extending recess into the substantially planar surface of the head, the second plug rotatably coupling the connecting device to the head.

2. The system of claim 1, wherein one or more devices generating a magnetic field are one or more magnets.

3. The system of claim 2, wherein the one or more magnets are three or more magnets.

4. The system of claim 2, wherein the one or more magnets are ferromagnetic bodies.

5. The system of claim 2, wherein the one or more magnets are cylindrically shaped.

6. The system of claim 1, wherein the one or more devices generating the magnetic field comprise an electric machine generating the magnetic field.

7. The system of claim 1, wherein the one or more devices not extending beyond the upper and lower surfaces are flush with the upper and lower surfaces.

8. The system of claim 1, wherein the substantially planar upper and lower surfaces of the connecting device, the substantially planar surface of the machine, and the substantially planar surface of the head are flat surfaces.

* * * * *